United States Patent

[11] 3,604,126

[72] Inventor John C. Whelan
Woodland, Calif.
[21] Appl. No. 10,506
[22] Filed Feb. 11, 1970
[45] Patented Sept. 14, 1971
[73] Assignees Adams & Whelan;
William O. Adams, Nancy Adams Bloom,
Elizabeth Adams Peabody and John C.
Whelan, a joint venture

[54] GRAIN TREATMENT APPARATUS
10 Claims, 8 Drawing Figs.
[52] U.S. Cl. .................................................... 34/57 C,
34/169, 99/237 R
[51] Int. Cl. .................................................... F26b 17/00
[50] Field of Search ........................................... 34/57 C, 57
A, 10, 169, 171, 64, 65; 99/237; 263/21 A, 21 B

[56] References Cited
UNITED STATES PATENTS
2,069,192  1/1937  Behr et al. ................... 34/169 X
2,371,619  3/1945  Hartley ....................... 34/171 X
2,529,366  11/1950 Bauer ......................... 263/21 A
2,702,742  2/1955  Hillard ....................... 34/57 A X
2,717,458  9/1955  Shabaker ..................... 34/169 X
3,435,536  4/1969  Tinley ........................ 34/57 A Primary Examiner—Frederick L. Matteson
Assistant Examiner—Harry B. Ramey
Attorney—Lothrop & West ABSTRACT: Grain treatment apparatus has a plurality of air boxes arranged one above the other in a column, each box having a perforated upper, horizontal surface constituting a tray. An air circuit includes a manifold for receiving air from spaces between the boxes and leading to an air-grain separator and a source of heat. Grain is fed to the uppermost tray, travels thereover and descends in a zigzag, series path over the other trays to a valve releasing the treated grain at a predetermined rate. There are walls and curtains and weirs within the column to define the air and grain passages.

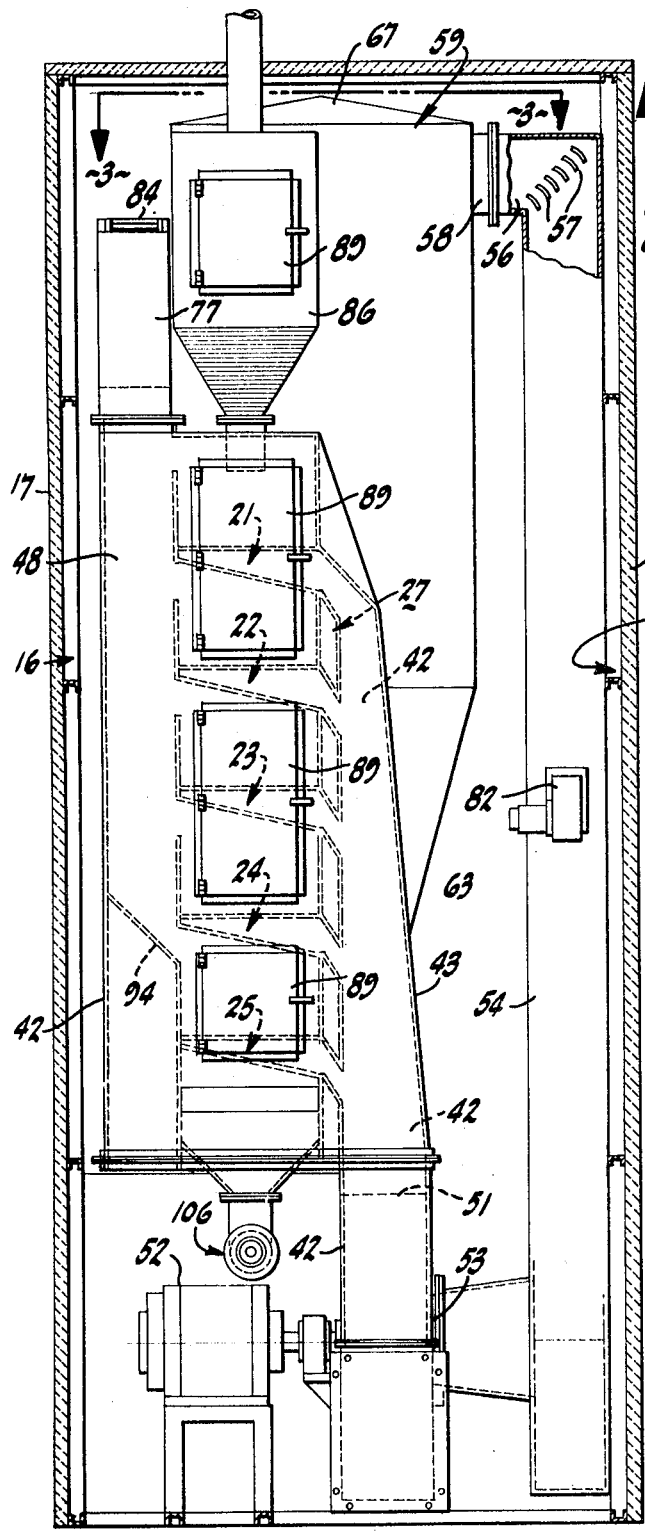
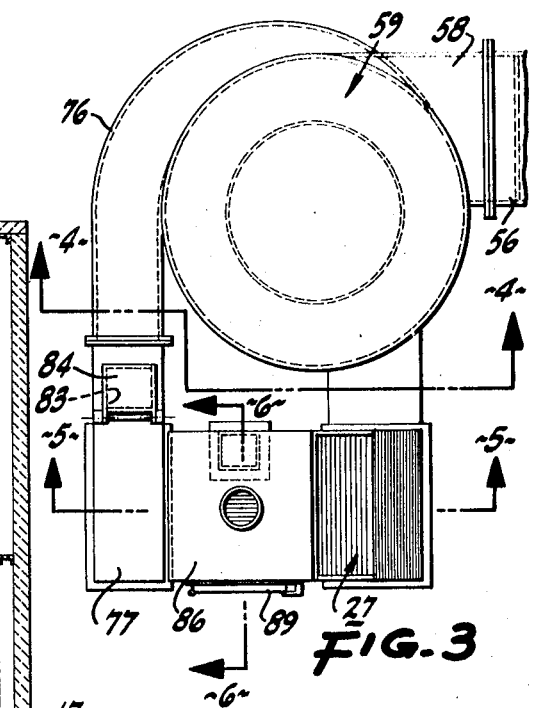
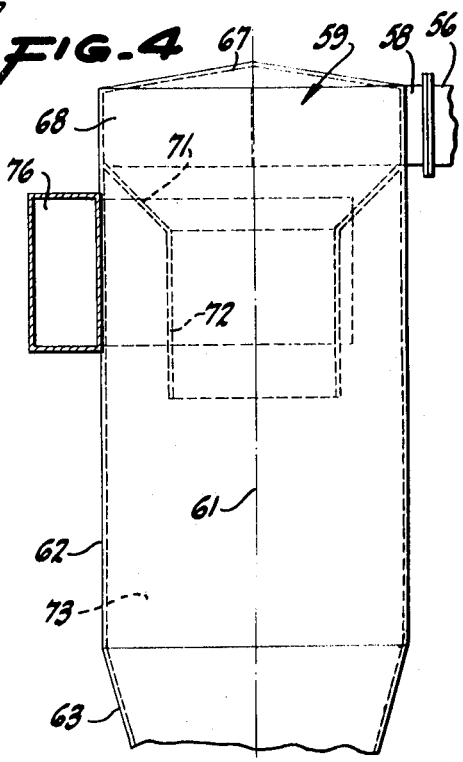
FIG. 2
FIG. 3
FIG. 4
INVENTOR
JOHN C. WHELAN
By Lothrop & West
ATTORNEYS INVENTOR
JOHN C. WHELAN
By
Lothrop & West
ATTORNEYS

GRAIN TREATMENT APPARATUS

Nutritional studies have shown that it is highly advantageous in many fields, particularly involving the feeding of animals such as cattle and chickens, to present the feed grain to them in a form which is more readily digestible and assimilable. This is accomplished by heating the natural grain in a relatively controlled atmosphere so that the grain partially expands or explodes not only to increase its bulk but also to effectuate various, nutritionally advantageous, chemical and physical changes in the grain stuff itself. While this treatment can be accomplished fairly readily on a laboratory scale, it becomes a problem to do so on a much larger scale and particularly by apparatus adapted to be utilized commercially and at the site of the animal feeding, for example. It is likewise difficult to accomplish the desired result with mechanism which is consistent in its performance and operates within the desired limits to afford substantially uniform treatment to large quantities of grain.

It is therefore an object of the invention to provide an improved grain treatment apparatus.

Another object of the invention is to provide a grain treatment apparatus which can be erected readily at any of various different sites.

Another object of the invention is to provide a grain treatment apparatus in which the handling of the grain is so arranged and controlled as to provide economical, consistent treatment of the grain within specifications.

Another object of the invention is to provide a grain treatment apparatus which is sufficiently simple as to be readily operable by relatively unskilled labor.

A further object of the invention is to provide a grain treatment apparatus which is economical in the use of power and fuel.

An additional object of the invention is to provide a grain treatment apparatus in which the grain is treated by immediate contact with warmed air and in which there is not only an economical use of the air but substantially no loss of grain by entrainment therewith.

A further object of the invention is to provide a grain treatment apparatus in which the grain is treated on trays, the grain load on each tray being maintained substantially as a uniformly distributed body.

Other objects together with the foregoing are attained in the embodiment of the invention described in the accompanying description and illustrated in the accompanying drawings, in which:

FIG. 2 is an end elevation of the apparatus of FIG. 1, portions being broken away to show interior construction;

FIG. 3 is a cross section, the plane of which is shown by the lines 3—3 of FIG. 2;

FIG. 4 is a cross section, the planes of which are shown by the lines 4—4 of FIG. 3;

Figure 1:
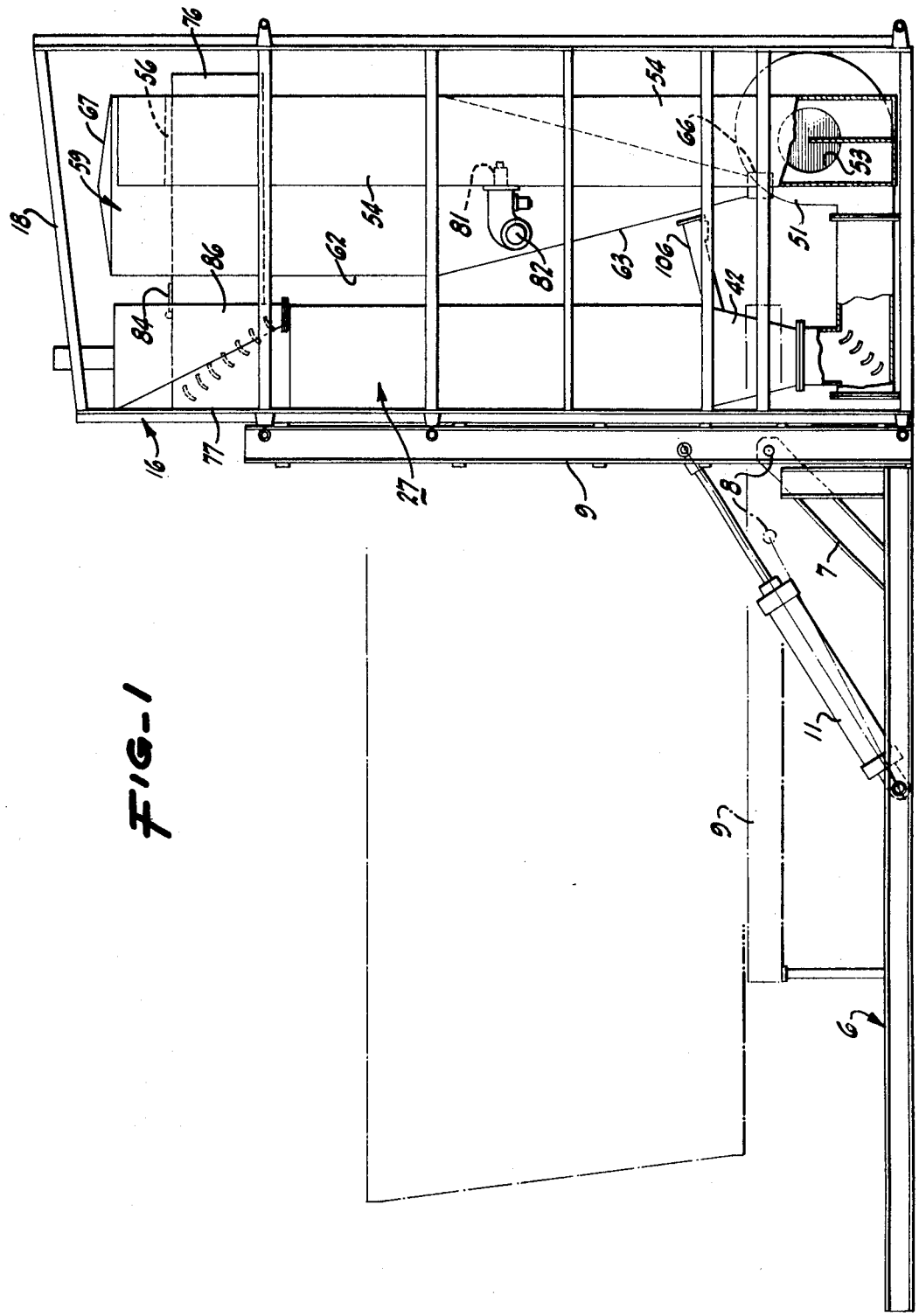
FIG. 1 is a side elevation of a grain treatment apparatus, the outer insulation being removed, and shown in operating position, portions being broken away to show interior construction.
Figure 5:
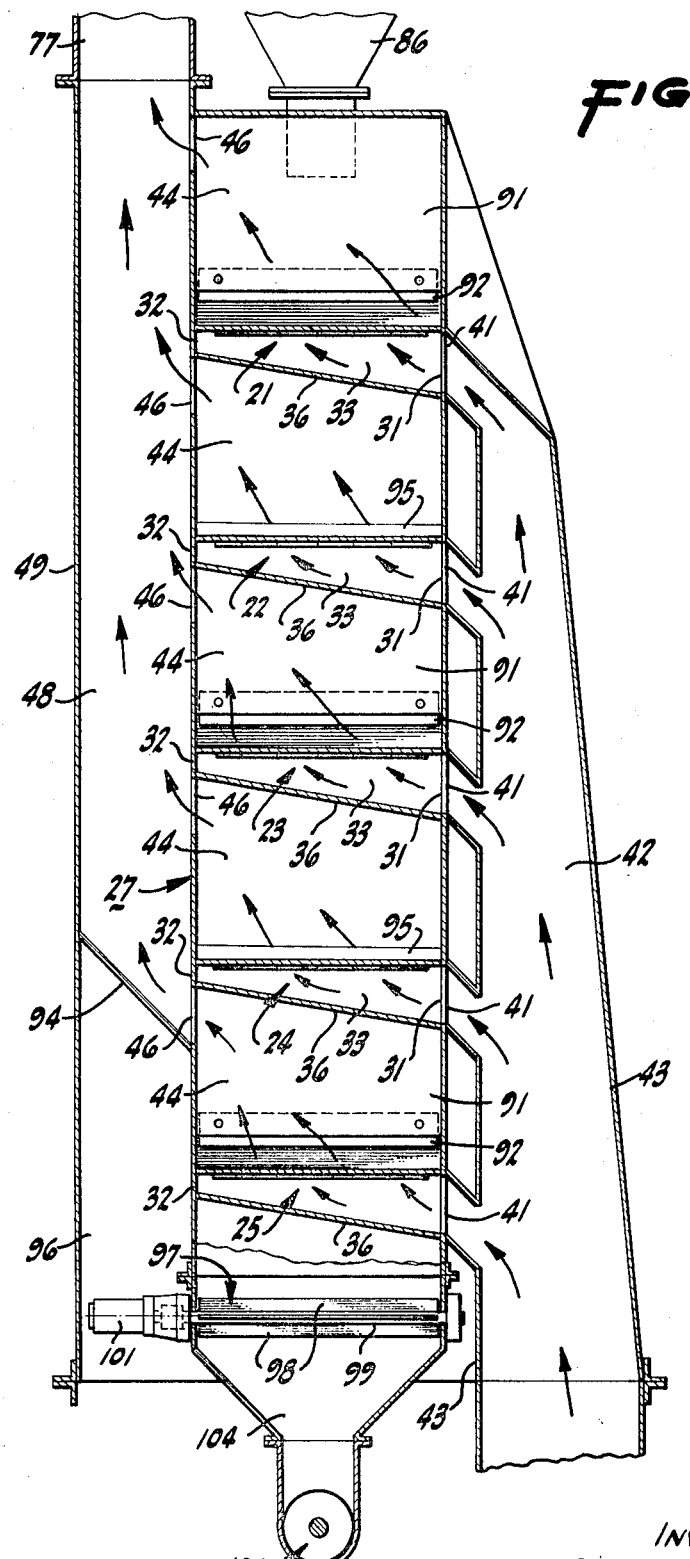
FIG. 5 is a cross section, the planes of which are shown by the line 5—5 of FIG. 3.

While the grain treatment apparatus pursuant to the invention can be embodied in a large number of different forms, it has with practical success been embodied substantially in the form disclosed herein. This form is especially adapted to be constructed in a factory and then readily shipped to one or more points of use, such as a cattle-feeding lot or a poultry-feeding establishment, and there set up and connected for operation at the feeding site. The arrangement is such that should there be a variation in the need for the apparatus due to seasonal factors or the like, the mechanism can readily be disconnected at one site and taken to another site and set up for continued use.

To fulfill the preference for portability, the grain treatment apparatus has a foundation frame 6 made of the usual structural shapes, such as channels, braces and the like, adapted to rest on a suitable ground support or foundation, although not necessarily fastened thereto. The base frame 6 has supports 7 mounting a cross shaft 8 serving as a pivot on a common, horizontal axis for a swinging main frame 9 adapted to be rotated about the axis of the shaft 8 as a center. A hydraulic jack mechanism 11 interconnects the base frame 6 and the swing frame 9 so that the main frame can, under manual supervision, be swung from a generally horizontal position on the base frame 6 to a substantially vertical position at right angles thereto. For fabrication in the factory and for the customary rail or road transport, it is convenient to have the swing frame 9 in a horizontal fashion, whereas in use the swing frame 9 extends substantially vertically and structure thereon extends vertically like a tower.

Secured to the main frame 9 is a tower frame 16 made up of the customary shapes, such as angles and braces, fastened together in a generally rectangular form and preferably being enclosed, for the most part, by sidewalls 17 often incorporating thermal insulation and sometimes also acoustic insulation. The tower frame 16 is not only enclosed on the sides but preferably also is provided with an inclined roof 18 so that the tower frame, when erected outdoors, affords a substantially weatherproof enclosure for the important components.

Appropriately mounted on and supported by the tower frame 16 is a vertical series of air boxes 21, 22, 23, 24 and 25, for example, arranged above each other in a vertical column 27. The number of boxes can be varied for different individual installations but the number illustrated has proved satisfactory under certain conditions of operation. Each of the air boxes is substantially like the others and in effect includes two sidewalls 31 and 32 and two end walls 33 and 34, each of the boxes also including an inclined bottom plate 36 and a top plate 37 disposed substantially horizontally in order to act as a tray. The air box is substantially closed or tight except where especially provided openings are disposed. The upper plate 37 is formed with perforations 38 preferably shaped as louvers formed to pass air in the direction of grain flow and arranged both crosswise of the tray and lengthwise of the tray. The louvers are formed to depend from the plate 37 to leave a substantially smooth upper surface on the tray.

The wall of the air box column is at appropriate intervals provided with apertures 41 leading from an inlet manifold passage 42 defined by walls 43. Air within the inlet manifold under superior pressure can flow in parallel through the various apertures 41 and into each of the air boxes and then through the louvers 38 into the spaces 44 above each of the trays. Correspondingly, the opposite wall of the air box column is likewise interrupted at intervals by apertures 46 opening from the spaces 44 above each of the trays. All of the apertures 46 lead into an exhaust manifold passage 48 defined by walls 49. The efflux of air from each of the chambers 44 is in parallel into the exhaust manifold 48 for discharge.

In order to induce the described airflow from the intake manifold 42 through the various air boxes and into the exhaust manifold 48, the tower frame 16 supports an air blower 51 discharging into the intake manifold 42 and driven by a suitable electric motor 52. The blower 51 has an air inlet 53 opening into a vertical supply duct 54. At its upper end the supply duct has an elbow 56, with turning vanes 57 therein, connected to the tangential discharge 58 of a cyclone separator 59.

The cyclone separator is generally symmetrical about a normally vertical axis 61 and includes circular cylindrical sidewalls 62 in the upper portion, merging with converging conical walls 63 in the lower portion and ending in a discharge opening 66. This is usually blocked by a standard valve and upon occasion is opened for discharge of accumulated contents. The top of the cyclone separator is closed by a conical roof 67.

Within the upper portion 68 of the separator and situated just below the tangential outlet 58 is a downwardly converging, conical baffle 71 having a rather large central opening from the edge of which a circular cylindrical sleeve 72 depends into a main chamber 73 within the separator. Also engaging the wall 62 of the separator in a tangential fashion is a scroll housing 76 opening into the chamber 73. The scroll connector 76 has an elbow 77 opening into the upper portion of the exhaust manifold 48. Air flow into the separator from the exhaust manifold is through the scroll housing tangentially then in a circuitous path around the sleeve 72 and then, with a reversal of direction, upwardly along the axis 61 and finally into the tangential outlet 58 to the supply duct 54.

With the foregoing air flow mechanism, air in the substantially closed circuit is induced to travel through the circuit by the motor-driven blower 51, flowing downwardly from the separator through the duct 54 and then moving under increased pressure through the inlet manifold, thence through the air boxes and, finally, through the exhaust manifold into the separator. Any heavy particles in the stream, such as dust, chaft and entrained grain, fall in the separator and accumulate in the lower cone 63 above the outlet 66. The particle-free air recirculates into the vertical duct 54 and thence back to the inlet manifold.

While the circulation of atmospheric air is of benefit under some circumstances, it is normally desired to circulate relatively warm air. For that reason there is appropriately installed in the supply duct 54 a burner 81 supplied with an appropriate fuel, such as oil, butane or natural gas, and also having a power driven blower 82 for forcing in atmospheric air in a quantity at least sufficient for complete primary and secondary combustion and often in an excess amount. When the burner is operated, atmospheric air is induced to flow past the burner and the products of combustion and any excess air are combined in the intermediate portion of the supply duct, serving as a combustion chamber, and increase the temperature of the air recirculating through the duct 54 and adding makeup air thereto. The moisture in the circulating air is added to by water of combustion so that, at least after a few initial cycles, the circulating medium is quite humid.

There is an outlet 83 leading from the connector 76 to the atmosphere. The area of the outlet is automatically varied by an unbalanced flap valve 84 which allows sufficient air to escape to maintain the desired pressure within the apparatus despite air addition at the burner 81. In this way the pressure conditions and pressure gradients within the apparatus are maintained at the desired values depending primarily upon the rate of operation of the blowers 51 and 82. By appropriately regulating the output of the burner 81 and the operation of the blower 51, there can be circulated the desired quantity of air at the desired velocity and at the desired temperature, all within quite narrow limits, the regulation being relatively straightforward and simple.

Although the airflow through the air boxes is generally one of repeated circulation in parallel paths, the flow of grain over the trays is primarily once-through or in a single path in series. Preferably, grain to be treated is received from any suitable source and is deposited into a hopper 86 in the upper portion of the tower frame 16, the hopper being enclosed on the sides and converging downwardly to an outlet connection 87 to the upper end of the column of air boxes. Grain in the hopper flows by gravity through the feed connection 87 into the uppermost chamber 44 above the upper air box 21 and is deflected by an angle baffle 88 onto the upper surface of the top tray 37. Access doors 89 are provided in the side of the hopper and in the air box column 27 to assist in cleaning and for observation.

It is particularly desired to maintain a relatively uniform bed of grain on each tray. For that reason and since the discharge opening or connection 87 is a substantial distance above the tray 37 of the top air box 21, I preferably provide a fixed plate defining a curtain 91 depending from one margin of the connection 87 and extending downwardly substantially parallel to the adjacent wall. The curtain ends at an edge strip 92 disposed a predetermined, short distance above the upper surface of the subjacent tray and arranged to move vertically a limited amount to vary the distance between the lower edge of the curtain and the subjacent tray.

With this arrangement, grain leaving the outlet 87 is deflected onto the top tray by the baffle 88 and, if at rest, has a fixed angle of repose on the top of the tray. The repose angle varies with the particular kind of grain being treated and the edge strip 92 is adjusted accordingly.

When the device is in operation air flowing from the air box is directed by the louvers 38 in such a fashion as to cause the grain flowing in under the edge strip 92 to advance across the top of the box, the grain thus coming into immediate contact with the warm air. The grain thus has its temperature increased and its moisture content balanced against that of the air in an environment of a predetermined nature. The grain is thus partially expanded or exploded and undergoes the desired treatment.

The air that has passed through the grain discharges through the adjacent opening 46 into the exhaust manifold 48 for recirculation as described, any entrained grain or condensed, excess moisture acquired from the grain or otherwise being taken out of the separator 59 at the opening 66. The grain itself is carried across the tray and falls by gravity over the far edge thereof through a discharge opening 93. This opening is in part defined by another curtain 91 depending to an elevation just above the next air box below.

To maintain the desired, reasonably uniform bed or layer of grain on each tray, there is provided along the discharge edge thereof a weir 95 preferably adjustable in height and extending partially or entirely across the tray. Thus, the edge over which the discharging, treated grain actually flows is defined by the weir top that can be set and arranged for best operation.

Figure 6:
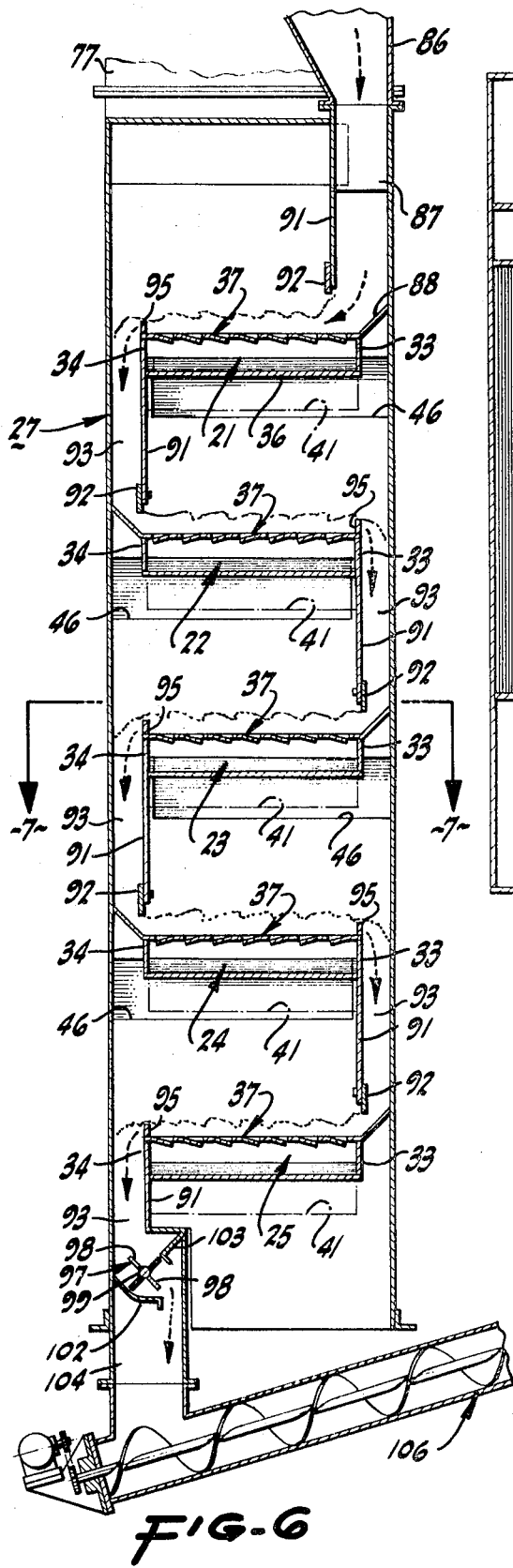
FIG. 6 is a cross section, the plane of which is shown by the line 6—6 of FIG. 3.
Figure 7:
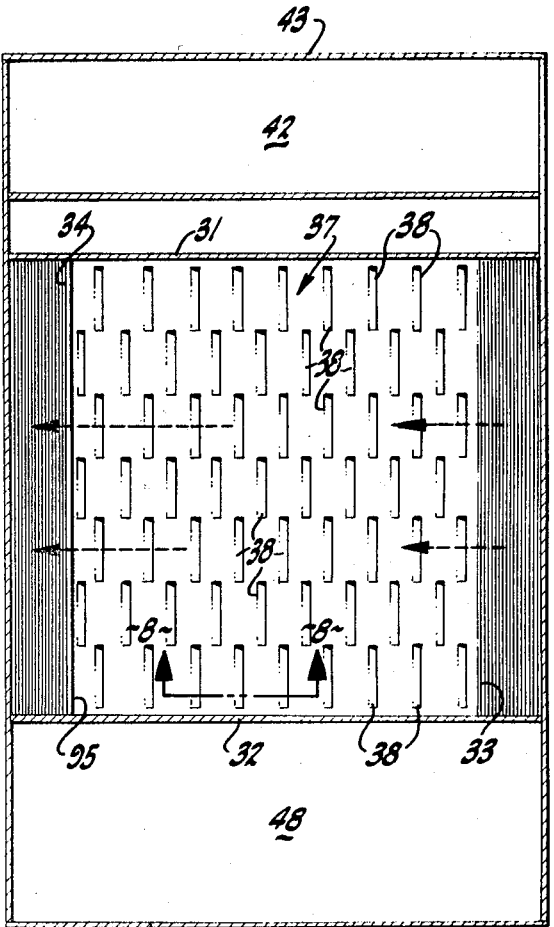
FIG. 7 is a cross section, the plane of which is shown by the line 7—7 of FIG. 6.
Figure 8:
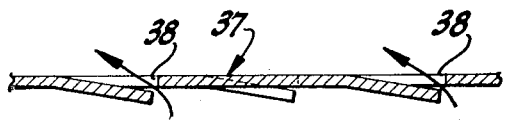
FIG. 8 is a cross section, the plane of which is indicated by the line 8—8 of FIG. 7.

In this fashion the tray of the uppermost air box 21 discharges over the weir 95 onto the tray of the subjacent air box 22 and the grain flow then continues in a similar fashion and in a zigzag, series path until the grain is finally discharged over the weir at the discharge edge of the tray of the lowermost air box 25. The air discharge from the lowermost air box 25 flows through its respective one of the openings 46 into the exhaust manifold 48 but below this the exhaust manifold is divided by an angle wall 94 to afford a separate chamber 96. Grain leaving the lowermost tray falls into the chamber 93 (FIG. 6) at the bottom of the column.

Pursuant to the invention, flow of grain from the chamber 96 is carefully regulated. The rate of discharge from the lowermost tray is so related to the influx of grain at the top of the column, that the grain discharged from the lower trap piles up in the chamber 96 to a height maintaining a fairly uniformly thick bed of grain on the lowermost tray 25. The bed of grain on the lowermost tray holds up arriving grain in the feed duct at the other end of the lowermost tray so as to form a barrier to outflow from the tray 24 just above. This assists the weir as to maintain a uniform bed on the tray 24 and the technique continues on up to the feed opening 87. By carefully regulating the outflow at the lowermost opening 93 there is maintained a uniformly advancing bed of grain of uniform thickness on each of the trays and the circulating air is confined to the described paths.

The flow from the chamber 96 is regulated by a valve under control of the operator. In this instance the valve takes the form of a rotor 97 having radial vanes 98 mounted on a drive shaft 99 extending from the side of the chamber. The shaft 99 is connected to a drive motor 101, the speed of which can be readily controlled to set the rotational rate of the rotary valve. The rotor vanes 98 are partially housed by a conformed wall 102 leading from the chamber 96 and by an inlet wall 103 also leading from the chamber 96. When the motor 101 is driven at an appropriate speed, grain from the chamber 96 is fed over the top of the rotor 97 and beneath the angled wall 103 to fall by gravity into a trunk 104 leading to an auger conveyor 106 discharging the grain from the machine.

By the provision of the described mechanism, it is possible to vary the temperature of air forcibly recirculated through the machine in paths which parallel themselves through the air boxes so that a number of relatively small batches or volumes of grain travelling through the machine in series are simultaneously and uniformly treated. There is little loss of heat from the circulating air except to the grain being treated, the heat loss being made up by the burner. The grain discharge is carefully regulated so that grain-filled passages and uniformly thick beds of grain are provided for each of the treatment trays. These are local adjustments in curtain height above the subjacent tray. The variable speed of rotation of an outlet valve affords a regulation of the discharge rate of the treated grain from the device.

The entire mechanism is mounted on a portable base, which can be fastened down if desired. The tower can be swung between a normally vertical position and a horizontal position. Fabrication and transport of the structure from one place to another are facilitated. Inspection doors allow access to the interior portions. The air boxes are so constructed that the louver trays can be cleaned and changed from time to time, if necessary, and so that trays of different louver configurations and spacings can be afforded for treating grains of different nature.

It has been found in extensive practice that once having been adjusted and set for a job, the mechanism operates without substantial supervision, minimum instructions to an attendant being sufficient to maintain the operation of the structure to produce the desired product.

What I claim is:

1. A grain treatment apparatus comprising a plurality of air boxes having perforated upper surfaces, constituting substantially horizontal trays, means supporting said air boxes one above the other, an air inlet manifold substantially closing the spaced between said air boxes at one side thereof except for air inlet openings between said air inlet manifold and said side of said air boxes, an air discharge manifold substantially closing the spaces between said air boxes at the other side thereof except for air discharge openings between said air discharge manifold and the spaces above said trays, means for supplying grain to one end of an upper tray, means for conducting grain from the other end of said upper tray to the other end of a lower tray, means for releasing grain from the one end of said lower tray, means in said releasing means for regulating the passage of grain therethrough, a source of hot air, means for conducting hot air from said source to said air inlet manifold, an air-grain separator, means for connecting said air discharge manifold to said separator, and means for returning at least some air from said separator to said air inlet manifold.

2. A grain treatment apparatus as in claim 1 in which at least one of said air discharge openings is in part bounded by a wall upstanding from the next lower tray.

3. A grain treatment apparatus as in claim 1 in which at least one of said grain conducting means is in part bounded by a curtain depending from the upper tray to a height a predetermined distance above the lower tray.

4. A grain treatment apparatus as in claim 1 in which the airflow from an air box tray is predominantly in one direction and the grain flow across said air box tray is predominantly in a direction at right angles thereto.

5. A grain treatment apparatus as in claim 1 in which the perforated upper surfaces of said air boxes have their perforations in the form of louvers directing air flowing therefrom in a direction across said upper surfaces.

6. A grain treatment apparatus as in claim 1 in which said means for regulating the passage of grain is also an air lock.

7. A grain treatment apparatus as in claim 1 in which said source of hot air is a flame supplied with combustion air and discharging the products of combustion into said air inlet manifold.

8. A grain treatment apparatus as in claim 1 in which said means for supporting said air boxes is connected by a horizontal pivot to a base.

9. A grain treatment apparatus as in claim 1 in which the grain travels over successive rows of said plurality of trays in series and the hot air travels through said plurality of trays in parallel.

10. A grain treatment apparatus as in claim 1 in which a weir is provided at said other end of at least one of said trays.